Sept. 10, 1968  R. C. BENTON  3,401,068
METHOD AND APPARATUS FOR UNIFORMLY ETCHING PRINTED
CIRCUITS BY CONTROL OF THE CONVEYOR SPEED
Filed Feb. 15, 1965  4 Sheets-Sheet 1

INVENTOR.
ROBERT C. BENTON
BY John W. Gaines
ATT'Y

Sept. 10, 1968     R. C. BENTON     3,401,068
METHOD AND APPARATUS FOR UNIFORMLY ETCHING PRINTED
CIRCUITS BY CONTROL OF THE CONVEYOR SPEED
Filed Feb. 15, 1965     4 Sheets-Sheet 3

INVENTOR.
ROBERT C. BENTON
BY John W. Gaines
ATT'Y

INVENTOR.
ROBERT C. BENTON
BY John W. Gaines
ATT'Y

United States Patent Office 3,401,068
Patented Sept. 10, 1968

3,401,068
METHOD AND APPARATUS FOR UNIFORMLY ETCHING PRINTED CIRCUITS BY CONTROL OF THE CONVEYOR SPEED
Robert C. Benton, State College, Pa., assignor to Chemcut Corporation, a corporation of Pennsylvania
Filed Feb. 15, 1965, Ser. No. 432,476
19 Claims. (Cl. 156—3)

ABSTRACT OF THE DISCLOSURE

A continuous etching machine having variable speed means for conveying articles to be etched therethrough. A speed control is provided responsive to the metal removal rate by etchant of the machine in an etching zone, and is operatively connected to the conveying means to maintain the speed values generally proportional to the etchant strength.

---

The present application relates to the etching of metal from a continuously conveyed series of objects. It more particularly relates to a method and apparatus for co-ordinating the rate of movement of the objects and the etch-rate strength of the etchant in the proper relation. A location for a sensing means can be established along the path of the moving objects at several points or a point in the etching zone, and the objects as they pass that point can each be sensed for their status in respect of being underetched or overetched.

A controlled amount of overetching is desired, thus insuring quality with uniformness, but without excessive metal removal. The objects are either speeded up or slowed down as required in the etching zone so that there occurs, always neither too soon nor too late, the transition as between the point of being in underetched state and the point just barely past the minimal etched condition where the objects attain overetched state. If, in an exaggerated though not altogether uncommon example, the objects when etched through are only halfway through the etching zone, they are considered to be 100% overetched by the time they reach and leave the end of the etching zone.

In a continuous spray etcher, the objects are fed through the etchant spray zone in a series, either in closely spaced apart relation with the objects separate, or in a continuous web form from which the individual objects are, at an appropriate stage, separated from the web and from one another. The objects so etched include many industrial articles such as thin metal grids, flat springs, and perforated sheets or masks, of which the unwanted portions are etched completely through from opposite sides of the metal, usually concurrently. The etching leaves intact all desired portions, those portions according to the practice constituting the so-called image area. The image area is that area which, preparatory to etching, has been precoated on opposite sides with registering patterns of a light hardened, organic photosensitive etch resist and which is protected thereby from the etchant so that, beneath the resist, the same pattern is retained in metal.

Other objects etched include printed wiring articles such as single sided and double sided work in the printed, etched circuit field. Printed circuit boards are panels manufactured for this purpose by bonding copper as a film or foil to one or both sides of a backing of insulating base material. The material is sometimes a melamine-formaldehyde or polyester composition, and fibre cloth is used at times; composite backings are common, including epoxy-impregnated glass cloth, and paper impregnated with phenolic or epoxy resins. Most of the backing materials—being about ⅛ inch thick in practice—are translucent and, in fact, they retain their property of translucency in thicknesses to at least about ¼ inch. On the other hand, the unwanted copper in the non-image area of one or both sides of the backing is decidedly opaque whenever present in a monomolecular thickness or thicker.

From the foregoing, it is apparent that presence or absence of metal in the unwanted areas of a metal article, or in the unwanted areas in the metallic film on a work side of an article can, if properly sensed, afford a ready means of automatic or semiautomatic control over a continuous etching process. The actual metal is completely etched through in the case of either of the articles, the chief difference being that the metal article is etched away from both sides to a point of breakthrough therebetween, whereas etch through of a metal film on an article transpires solely from the outer side of that film to the point where the last trace of non-image metal disappears from the backing.

An object of my invention is, in the general organization of a continuous etcher wherein etchant eats completely through thin metal in unwanted areas over a substantial portion of articles such as the foregoing objects, the provision of a conveyor movable continuously over a path in the etcher for carrying the articles through and past the etching zone, and an under-and-over etch responsive controller connected to the conveyor, the controller being located at a station adjacent the end of said path in the etching zone to sense the presence or absence of metal in the unwanted metal areas of the articles, and operative to change the conveyor speed in a speed decreasing direction in response to underetching and in a speed increasing direction in response to overetching.

An unforeseen result of so controlling the conveyor of an etching machine is that it obviates a major difficulty in continuous etching and substantially reduces human error. In the example of one of the common metal etch solutions in use, I have observed that its metal removal or etch rate increases when the temperature of the solution rises; more particularly, a temperature increase of the solution from room temperature to its preferred etching temperature necessitates roughly a 2:1 increase in conveyor speed. The difference in effectiveness of the same etching solution, first, when fresh, and second, after a sustained period of etching of three hours necessitates a 1:5 decrease in conveyor speed. Initial etchant concentration, the rate and method of application of the etchant to the work, and the presence of impurities and/or additives in the etchant are further variables which reflect themselves by changing the etch rate.

While overetching to a degree is desired as above indicated, it is appreciated that the latitude allowed for overetching can become extremely critical. In other words, the attendant lateral attack, also known as undercutting, may not be particularly severe in certain printed etched circuits which can accommodate 50% to perhaps 100% or more overetching without impairment; whereas a much lower percentage of overetching may be all that can be tolerated in other articles wherein one one-thousandth of an inch or more of undercut of the metal edges immediately below the margins of the resist would provide a final product of unsatisfactory quality.

It becomes highly advantageous to maintain an average speed of articles passing through the etching zone which is proper for the then-current condition, thus confining the percentage of overetching to a precise range.

It is an additional object of my invention to provide, in the etching of metal from articles passing in a continuous series through the etching zone in an etcher, an improved process of setting the articles in movement at one speed among a given series of stepped, fixed, speeds in a path through the spray etcher leading from beginning to end of the etching zone; sensing, at closely spaced apart points which are along said path and which vary in their remoteness from the end of the zone, the status of the articles at those points in respect of being underetched or overetched; and, alternately, dropping speed to the next lower step when the articles sensed at a relatively less remote point have not made transition to an etched through condition, and raising speed to the immediately higher next step when the articles sensed at a remote point have already reached the etched through condition.

It is another object of the invention to provide a process as above, wherein the sensing is photoelectric.

It is a further object, in a modified form of the invention, to provide the above process, wherein the sensing is by electromechanical contact.

It is an object, in a further modified form of the invention, to provide apparatus which is in a position confronting an extended longitudinal area of the passing articles; and which presents a means of continually sensing the average of that area of the articles in respect of underetching and overetching; and which continuously proportionally adjusts the rate of movement of the articles in a speed decreasing direction when the sensed average of the area is predominantly underetched and in a speed increasing direction when the area sensed is predominantly overetched.

While primarily adapted for pressure induced spray etching work, my invention equally applies to paddle induced spray etching procedure in which the moving articles are splashed, and also procedures wherein the articles are immersed for a portion of the path of transit through the etching zone, or immersed throughout the path completely, either with or without being additionally subjected to immersed jets or forced currents in the bath while so immersed.

Further features, objects, and advantages will either be specifically pointed out or become apparent when, for a better understanding of my invention, reference is made to the following written description, taken in conjunction with the accompanying drawings, which show certain preferred embodiments thereof and in which.

Figure 1:
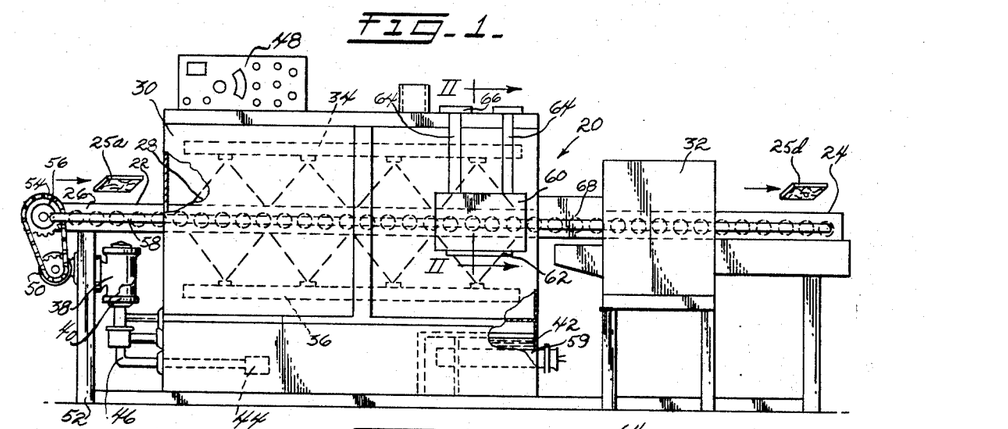
FIGURE 1 is a front elevational view of a continuous spray etcher embodying the present invention.

More particularly in FIGURE 1 of the drawings, an etching machine 20 of the spray etcher type is shown having an end loading station 22 and an end unloading station 24. Unetched articles 25a are introduced onto a continuously running conveyor 26 at the end loading station 22. They are conveyed thereby through the etching zone 28 of a spray chamber box 30, through a rinse section 32 comprising one or more rinse spray chambers, and thence to the unloading end station 24 from which the etched articles 25d are removed and collected for further processing. Front and rear groups 34 of upper spray nozzles mounted in the spray chamber box 30 discharge downwardly in the plane of the conveyor 26, and front and rear groups 36 of lower spray nozzles discharge upwardly in the plane of the conveyor; the latter nozzles are used in the case of work requiring etching from both sides. Preferably, two electric pump units 38 and 40 are employed to supply the etchant, enabling the upper nozzle groups 34 to have a separately controllable source of supply from the lower group 36, in case single sided work is to be processed.

From a pool 42 of etchant collected in a tank in the bottom of the spray chamber box 30, the electric pump units 38 and 40 draw the etchant through individual filters 44 into the suction side 46 of the pumps. The pumps of the units are preferably centrifugal pumps incorporating an acid resistant plastic rotor, and the discharge side of each pump has an appropriate connection to the nozzle groups supplied by that pump.

A variable speed drive for the conveyor 26 comprises a speed control included in a control box 48, and further comprises an electric drive motor 50, which motor is mounted on an upright in the frame 52 of the etching machine at a point slightly below the loading end station 22. The shaft of the motor 50 carries a small sprocket which is connected by a chain 54 and another sprocket 56 to move the driven walking beams 58 of the conveyor 26.

The control box 48 is connected by conventional electric circuits to the electric pump units 38 and 40, to the motor 50, as already noted, to a series of solenoid controlled cooling coils, not shown, which are located in the bottom of the tank 42 of the spray chamber box 30, and to an electric heating coil 59 located in the bottom of the tank. If copper is the metal being etched from the articles, one suitable etchant in the tank is an aqueous ferric chloride solution; for best results the temperature is regulated by the cooling coils or the heating coil 59 as appropriate.

At the front or the rear of the machine 20 alongside the path of the articles in the etching zone 23, a sensing head 60 is provided at a station so as to be near the end of the etching zone. A platform 62 supports the head 60 in a horizontal plane and is suspended by means of hangers 64 depending from brackets 66 mounted on top of the spray chamber box 30. The sensing head 60 is connected to operable means in the control box 48 consisting of a speed control so as to control the conveyor drive motor 50 in a manner to be explained. Two panels, not shown, are located at either the rear or the front of the machine so as to be spaced away from and on an opposite side to the sensing head 60. The panels are slideable on longitudinal, horizontally extending tracks to provide access both to the sensing head where it enters the etching zone and to the articles within the machine, and they are appropriately sealed to prevent leakage. Preferably, the panels are made of a transparent, etchant resistant plastic allowing both the article movement and the spray nozzle action to be observed while the machine is in operation.

Suitable labyrinth seals or traps, not shown, are fitted around the conveyor 26 at the inlet to the etching zone, and in a covered bridge 68 between the etching zone and the rinse section 32 to prevent escape of the etchant. Similarly, a seal or trap, not shown, is provided on the exit side of the spray rinse section 32 to prevent carryover of the rinse water which otherwise might spill from the etching machine.

Figure 2:
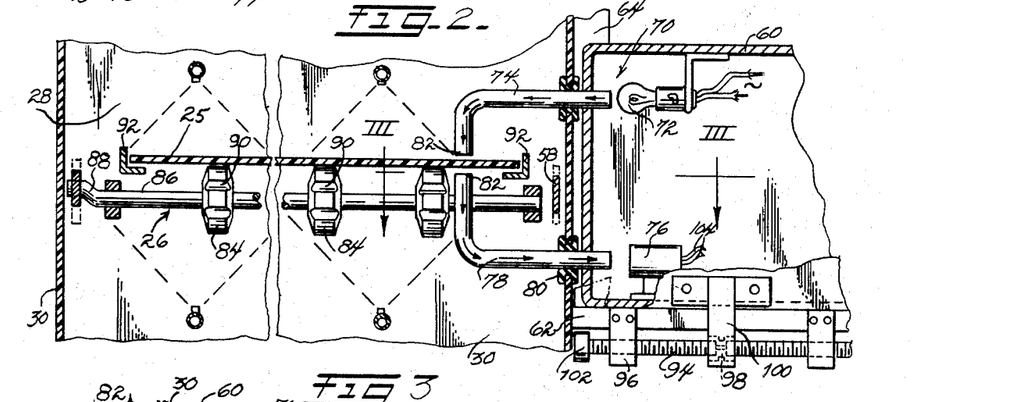
FIGURE 2 is a transverse sectional view in elevation, taken along the section lines II—II of FIGURE 1.

As shown in FIGURE 2, the sensing head 60 carries a series of devices, one of which is generally indicated at 70. A lamp 72 in each device 70 is supplied with AC from a current source, not shown, and shines light through the inner end of the horizontal portion of a transparent plastic, light transmitting rod 74. A photosensor 76 is aligned in light receiving relation with respect to the inner end of a horizontal portion of a companion transparent light transmitting rod 78 made of plastic. The rods 74 and 78 project laterally from the head 60 through seals 80 in the adjacent wall of the spray chamber box 30 and have right angled bends so that their terminals 82 are at points which are in a common vertical, longitudinal plane and which, in closely spaced apart relation thereto, confront opposite sides of a passing article, generally indicated at 25.

The conveyor 26 consists of a roller table driven by the walking beams 58 disposed at the opposite sides of the conveyor and each moving in an endless closed path. A succession of transverse rows of rollers 84 is provided, each row of the rollers 84 being fast to a live axle 86 connected at one end to the walking beam 58 at that end by means of a crank 88. The conveyed articles move in a horizontal plane longitudinally through the etching zone 28 along the tops of the rollers 84. Each roller 84 is of plastic and has a bevelled periphery which is notched to provide a set of circumferential teeth 90. Fixed, angle shaped guides 92 confine each of the articles 25 to a fixed path of movement so that they are longitudinally aligned at all times.

The roller table hereof and other common matter are detailed in some further regards in the description appearing in my copending patent application U.S. Ser. No. 432,475 filed Feb. 15, 1965.

An adjusting screw 94 is threaded in brackets 96 carried by the fixed platform 62, and has a reduced section 98 which is journalled in a bracket 100 carried by the sensing head 60. By means of a knurled head 102 on the screw 94, the sensing head 60 is adjusted transversely of the path of the articles 25 so as to move the terminals 82 of the devices 70 into the common vertical longitudinal plane desired with respect to the near edge of the articles 25.

Figures 3, 7:
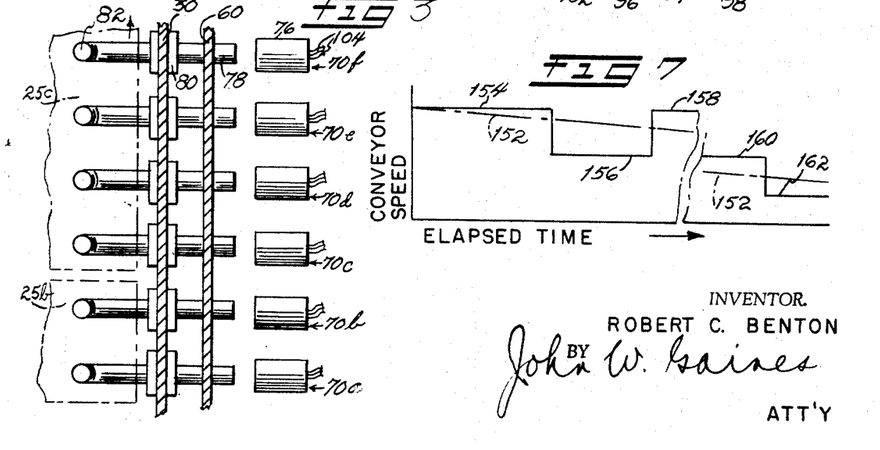
FIGURE 3 is a sectional view in top plan taken along the section lines III—III of FIGURE 2.
FIGURE 7 is a speed-time plot of the performance of the conveyor in the continuous etcher of FIGURE 1.

In FIGURE 3, the direction of article movement is indicated by an arrow, and differing subscripts are used to designate the respective successive articles 25b and 25c. Similarly, differing subscripts are used to designate the successive sensing devices 70a, 70b, 70c, 70d, 70e, and 70f within the sensing head 60. Each photosensor 76 creates a signal in current which is communicated by conductors 104 and which depends in its magnitude upon whether the photosensor is in light or in darkness.

Figure 4:
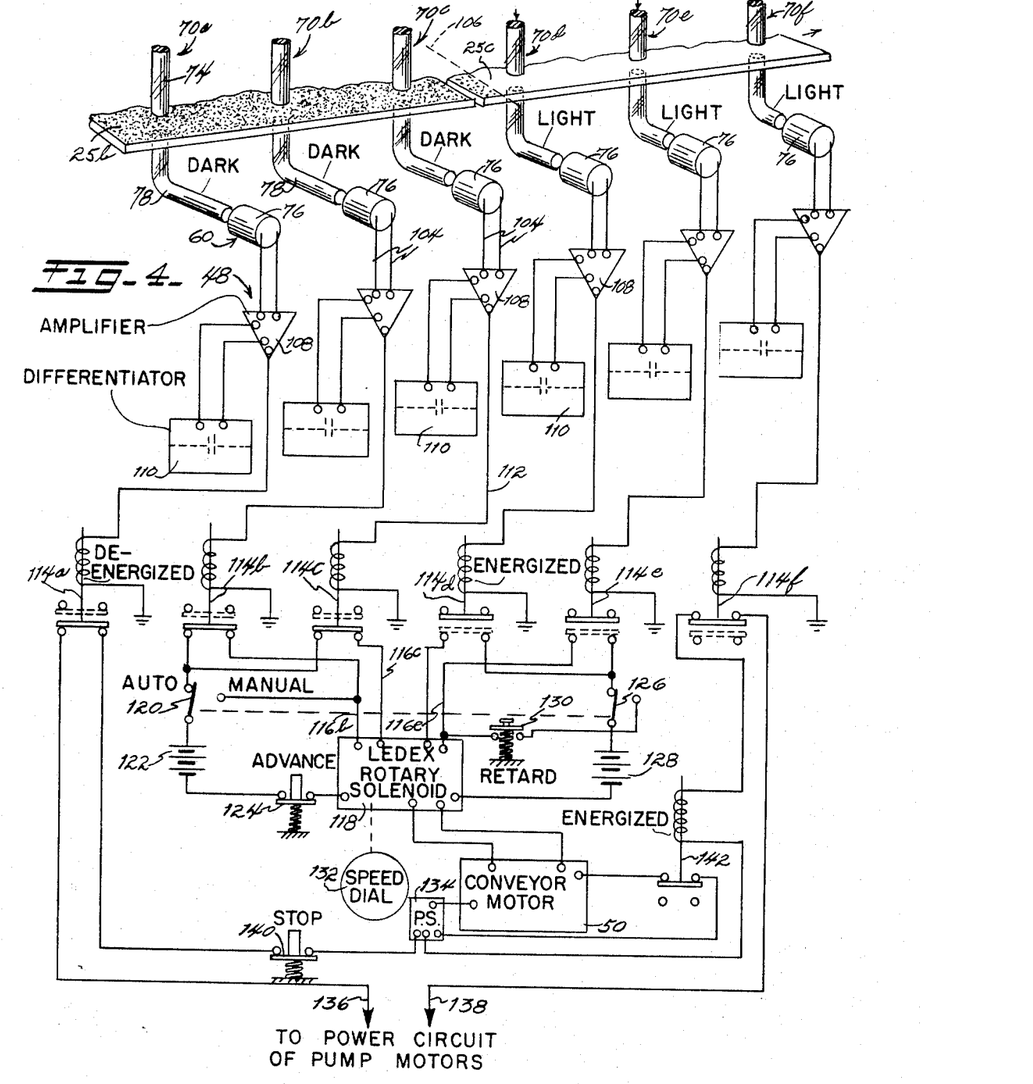
FIGURE 4 is a view, partially in isometric based on FIGURE 3, and partially schematic to show the electrical control circuit.

In the overly simplified showing of FIGURE 4, the dotted division line 106 indicates the transition point occurring on the trailing portion of article 25c wherein the article changes from its unetched condition such as is exemplified by the complete article 25b shown to the left of line 106. To the right of the division line 106, the article 25c is indicated to be free of any metal film and, for simplification, the desired pattern which is delineated by and between the metal retained and the metal free portion is omitted.

As a result of the opacity of article 25b, the photosensor 76 of device 70c is in darkness and communicates a low voltage signal through conductors 104 which are connected to the input of an amplifier 108. A differentiator 110, schematically indicated by a capacitor circuit, is connected to the amplifier 108, and a conductor 112 connected in the output of the amplifier 108 connects the amplifier to an electromagnetic relay 114c. The relay 114c is precalibrated so as not to respond to a low voltage signal and thus the deenergized relay maintains a circuit 116c closed.

The photosensor 76 of the next successive device 70d of the sensing head is illuminated and maintains its corresponding calibrated, electromagnetic relay 114d in an energized state so as to keep open a circuit 116d controlled by the relay 114d.

A rotary solenoid 118 included in the relay circuits is connected to the conveyor motor 50 for controlling current supplied thereto by a power source 134, so that the conveyor runs steadily at any given one of a series of stepped, fixed speeds, and moves the articles being etched at such speed.

The circuit 116c is connected through a manual-automatic switch 120 to one side of a current source 122, and the relay circuit 116c is connected through the rotary solenoid 118 and through an advance switch 124 to the other side of the current source 122.

A satisfactory make of solenoid is the Ledex rotary solenoid. This solenoid 118, without stepping and without affecting the motor 50, merely recocks itself when the relay circuit 116c is caused to close, and the solenoid 118 then awaits an actuating signal. However if, and each time when, the relay 114c opens the circuit 116c, the solenoid 118 reacts to current interruption to step once in a speed advancing direction so as to raise the speed of the motor 50 to the next faster step.

Similarly, but for an opposite effect, the relay circuit 116d is connected through a manual-automatic switch 126 to one side of a current source 128, and is connected through the solenoid 118 to the other side of the source 128. When the relay 114d is opened, and as long as it remains open, the solenoid 118 does not affect the motor 50 which runs steadily at one speed. However if, and each time when, the relay 114d moves into the closed position as shown by dotted lines so that a current initiating signal flows in the relay circuit 116d, the solenoid 118 steps once in the motor retarding direction and reduces the speed of the motor 50 to the next slower speed.

Hence if an article has already made the transition from the underetched condition before passing the device 70c, the conveyor motor 50 advances in speed one step; whereas if the transition point indicated by the division line 106 occurs to the right of the device 70d as viewed in FIGURE 4, the conveyor motor 50 reduces speed by one step. When the speed is reduced for example, the slower speed condition obtains and enables the sustained attack of the etchant on the slower moving articles to cause the division line 106 to shift again to or past the desired station between the devices 70c and 70d.

In FIGURE 4, another relay 114b is like the relay 114c, except that the relay 114b is operated by a more anterior device 70b which senses an excessive condition of overetching. The relay 114b is of cumulative effect and, when it opens a relay circuit 116b, the conveyor motor speed advances an additional step faster. If the switch 120, from the solid line position shown, is switched into the other position, this action likewise throwing the companion switch 126, the solenoid 118 is placed under manual control and each depression of the advance switch 124 causes the motor 50 to operate one speed step faster than before. A relay circuit 116e and another branch circuit including a retard switch 130 have an opposite effect from the foregoing, and with each operation of either the relay 114e in the circuit 116e or the retard switch 130, the conveyor motor speed reduces each time by one step. A speed dial 132 is connected directly to the control for the motor 50, or as illustrated, is connected to the solenoid 118 for providing incremental speed changes of the motor to any fine speed desired.

The power source 134 which supplies current to the motor 50 has two branches 136 and 138 leading to the power circuit of the electric pump units 38 and 40, not shown. The branch 136 includes a depressible stop switch 140 and the normally closed contacts of a relay 114a. The other branch 138 includes a relay 142 which is normally energized and which normally closes the circuit between the power source 134 and conveyor motor 50, and another relay 114f which is normally energized and which is normally closed in the branch 138. In an emergency condition of overetching, the photosensor 76 in the device 70a energizes the relay 114 to open the power circuit so as to shut down both the conveyor motor 50 and the electric pump units. In the other emergency condition when the photosensor of the device 70f is in darkness due to extreme underetching, the relay 114f releases to open the circuit and shuts down the conveyor motor 50 and the electric pump units 38 and 40.

Figure 5:
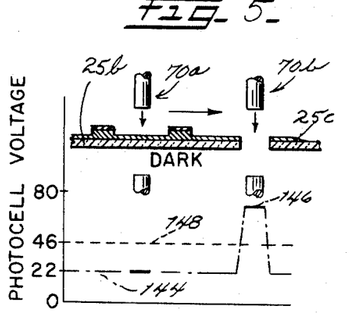
FIGURES 5 and 6 are each a composite view to illustrate typical conditions sensed by the photosensitive devices, and the corresponding voltage outputs under those conditions.
Figure 6:
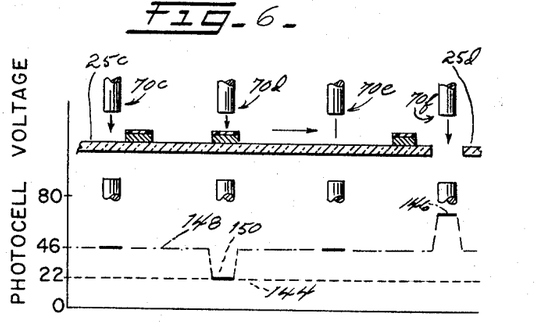

It is evident that each of the devices 70a, 70b, etc., appearing in FIGURES 5 and 6 functions in an on-off manner in the system, irrespective of whether thin, all metal articles such as grids are being etched or metal covered articles such as printed circuit boards. In the latter case, and specifically in accordance with FIGURE 5, the devices send out a low voltage signal indicated by the constant voltage chain line 144 at all times when the light path is blocked by opaque articles. For an occasional instant, due to a hole in the article or to the gap between the closely spaced apart successive articles, a false high voltage reading signal 146 occurs but the effect is only transitory and the differentiator 110, not shown, rejects the false signal. The other voltage signal from the devices has an intermediate constant voltage level shown in short dashes 148.

In FIGURE 6, when the articles are in overetched state, the output signal of the photosensor stays at the intermediate voltage level indicated by a chain line 148. Transitory false signals, such as the signal 150 due to passing of a conductor in the pattern, or a gap signal mark 146 due to the gap between articles, or a false signal due to a hole in an article are rejected by the differentiator 110, not shown. The voltage signal for the other, opaque state is shown by the steady voltage level indicated by short dashes 144.

In the instance of thin metal grids which are etched so as to produce narrow cross bars and relatively large square or rectangular openings therebetween, it is evident that the on-off operation of the photosensors will yield a low voltage signal corresponding to the level 144 and a high voltage signal corresponding to the fully illuminated level of the mark 146. Appropriately calibrated relays are used in each instance, coordinated to the voltage levels to be encountered.

In FIGURE 7, the ideal conveyor speed plotted against time is indicated by a chain line curve 152. The curve happens to slope down (negative) as illustrated, which is the general performance characteristic as the etchant becomes spent in its strength. The direction of slope however is not critical and, during warm-up of an etching machine as the etchant increases in temperature, the curve of ideal conveyor speed during that period has positive slope. The actual conveyor speed is a solid line curve, of which the constant speed, high first portion 154 is illustrative of the speed set by the device 70c once it has sensed an overetched condition. That constant rate is maintained until the division line 106 (FIGURE 4) gradually progresses to a point to the right of device 70d. At that point, the relay 114d (FIGURE 4) responds to a signal due to darkness over the photosensor and retards the conveyor speed to the next lower step 156 appearing in FIGURE 7. That condition of less light, which means underetching, allows the conveyor operation to conform to slower speed portion 156 of the solid line curve so as to maintain article movement at a relatively slow rate.

The lower speed level 156 obtains until the division line 106 has shifted to the left of device 70c as viewed in FIGURE 4, whereupon the speed automatically returns to the level of the portion 154 as indicated by the portion 158 of the solid line curve. It is thus seen that the horizontal lengths of the portions 154, 156, and 158 are in a proportion to one another so that they will average out equivalent to the chain line curve 152.

In FIGURE 7, the portion 160 of the curve shows the corresponding speed to which the device 70d steps the solenoid due to moderate underetching. When the etchant becomes weak, the increased underetching will be sensed by the next successive device 70e which will reduce the speed to the next lower step indicated by the solid line portion 162. It is understood that if the etchant is worked for too long a period, the device 70f will shut down the machine as soon as the underetching becomes extreme.

Figures 8, 9:
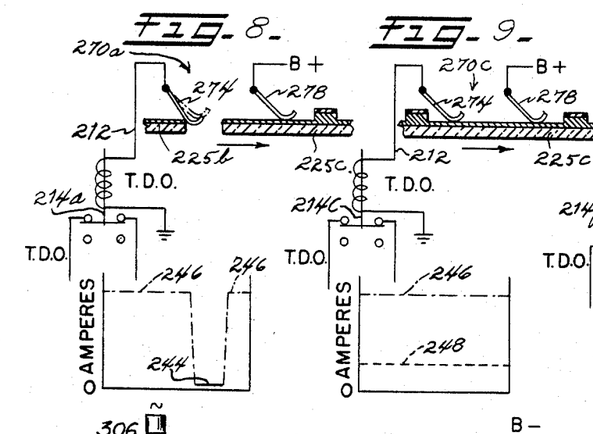
FIGURES 8, 9, and 10 are each a composite view corresponding in general to FIGURE 5, but showing one modified sensing device.
Figure 10:
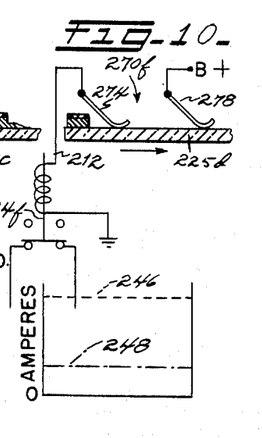

In the modification of FIGURES 8, 9, and 10, a conductivity measuring system is employed. The sensing head which is utilized includes a device 270a, a series of four intermediate devices such as the device 270c and an end device 270f. Each device comprises a relay circuit 212 including spaced apart brushes 274 and 278 which ride as contact terminals or electrodes on the substrate-mounted metal material of the passing articles and which together therewith form current conducting means to complete the circuit and operate the respective relays 214a, 214c, and 214f. The relays include time delay opening contacts and, for purposes of closure, the relays are pre-calibrated so as to pull in only when energized with a substantial current.

While two adjacent brushes 274 and 278 are riding upon the copper of a common underetched panel, they close the circuit 212 and allow current to flow having the magnitude 246 illustrated in FIGURES 8 and 9. In FIGURE 8, when the brush 274, for example, falls into a gap between consecutive articles 225b and 225c, the current temporarily drops to the transient value 244 giving a false signal. However, due to the time delay opening contacts of the relay 214a, the false reading is rejected and the contacts remain closed awaiting resumption of the current at the level 246.

Any of the contact terminals, such as the brushes 274 and 278 of FIGURE 10, which ride on an overetched article conduct only that quantity of current which etchant film can carry. This current is indicated by the chain line 248 and is insufficient to pull in the relay 214f and is insufficient to hold in the relay if already pulled in. No false readings are possible with an overetched article such as the article 225d and, in the case of copper printed circuit boards, the current level 248 can never rise toward the high current value 246 and will only drop farther when one of the brushes 274 or 278 rides into a gap between articles.

Figures 11, 13:
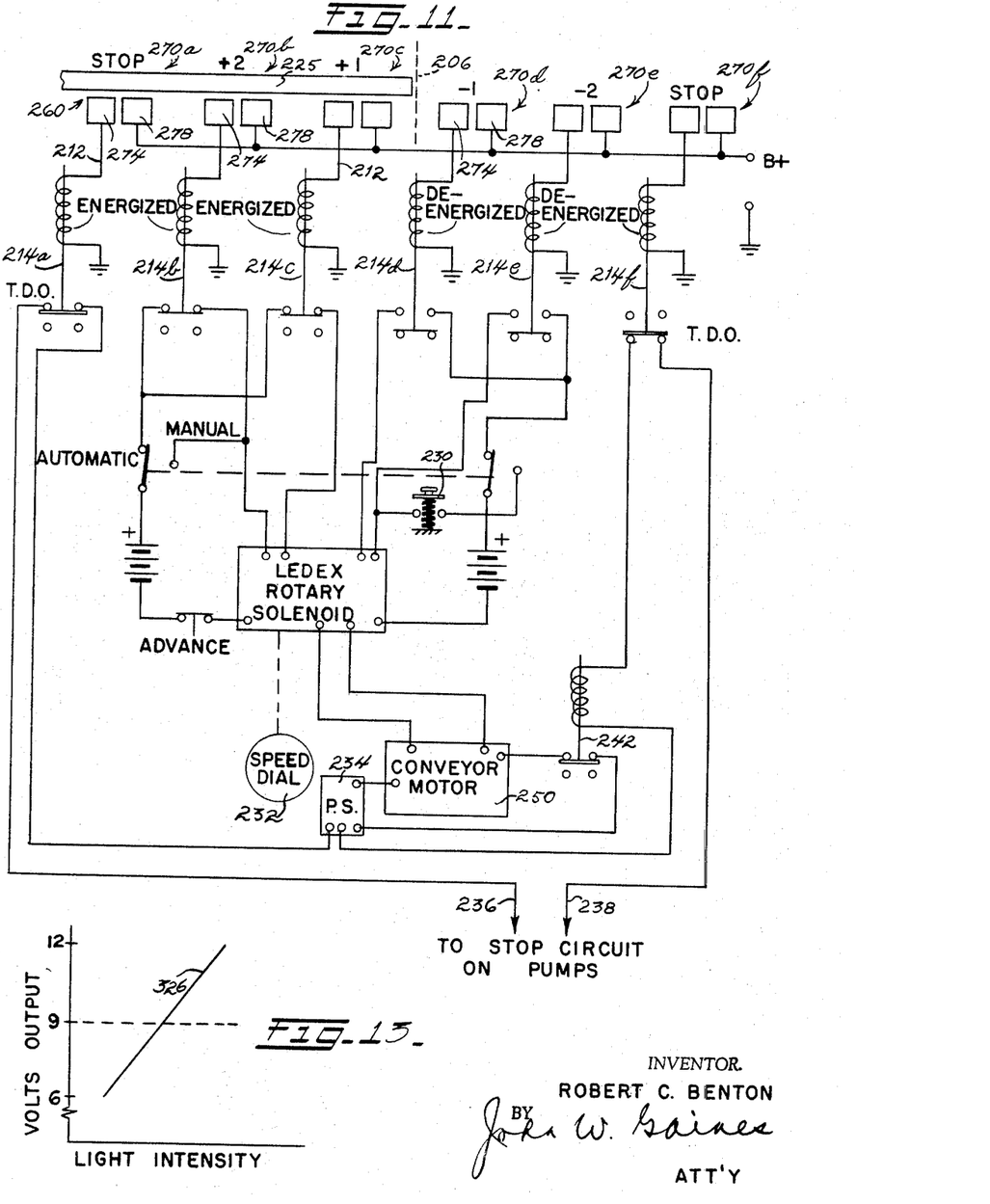
FIGURE 11 corresponds to FIGURE 4, except that the schematic diagram shows the electrical control circuit of such modified sensing device.
FIGURE 13 is a calibration curve of the photosensitive portion of the circuit of FIGURE 12.

In FIGURE 11, the sensing head 260 employing a conductivity measuring system as just described is schematically shown. On the basis of a transition division line occurring at 206 in FIGURE 11, the copper on the underetched articles 225 is shown as completing the circuit between each pair of brushes 274 and 278 disposed to the left of the division line 206. The pairs of brushes 274 and 278 to the right of the division line 206 are indicated to be open circuited, although in fact they are closed to the extent to which the etchant film will electrolyze and conduct therebetween. The notation is essentially the same as in the preceding embodiment of FIGURE 4. Briefly the device 270c upon sensing overetching will advance the speed of a conveyor motor 250 one step faster; whereas the device 270d upon sensing underetching will reduce the speed of the conveyor motor 250 one step slower.

During excessive underetching, the device 270b will advance the conveyor speed one step more than advanced by the device 270c; whereas the device 270e upon sensing underetching will retard the speed one speed slower than set by the device 270d.

After the fashion of the embodiment previously described, the device 270a will shut down both the conveyor motor and the pump units upon sensing extreme overetching; whereas the device 270f upon sensing extreme underetching will shut down the conveyor motor and the pump units.

Figures 12, 14:
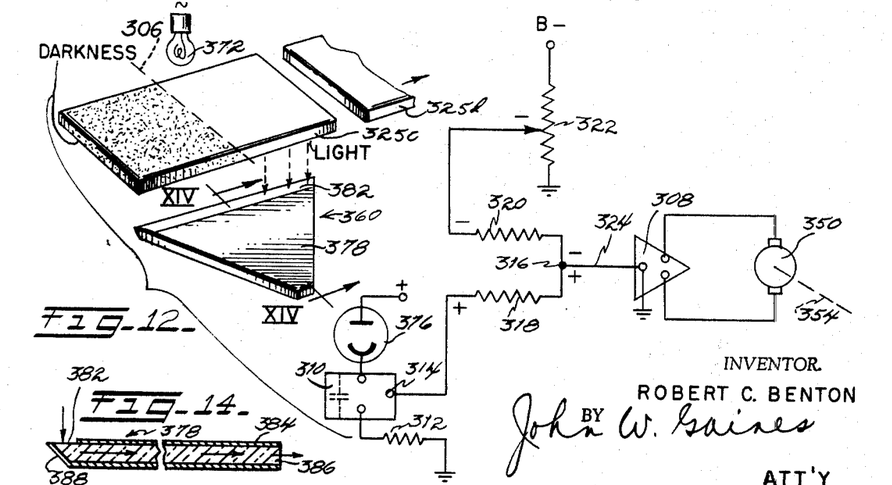
FIGURE 12 is a schematic diagram to show the electrical control circuit of another modified sensing device.
FIGURE 14 is taken along the section lines XIV—XIV of FIGURE 12 and is an enlarged scale view in side elevation.

In the embodiment of FIGURE 12, a sensing head 360 employing a proportional etcher control system includes a device 378. The device presents a fixed, extended, longitudinal surface area 382 which confronts an extended longitudinal area along the passing articles so as to sense a lamp 372 on the opposite side. A division indicated by the dashed line 306 on the article 325c represents the demarcation point at which the article makes its transition from the underetched state. Light from the lamp 372 is blocked to the left of the division line 306 whereas the light to the right of the line 306 illuminates a portion of the area 382.

The device 378 collects the light and directs it to a photosensor 376. The photosensor 376 is connected by a differentiator 310 to a grounded resistor 312. As the photosensor 376 conducts due to increasing light, it raises the voltage on a terminal 314 provided on the differentiator 310.

A potentiometer provided with a center tap at 316 has the positive branch 318 connected to the terminal 314 on the differentiator 310. The negative branch 320 of the potentiometer is biased by an adjustable negative potentiometer 322. The negative potentiometer is adjusted to provide a zero voltage at the tap 316 when the device 378 is half illuminated and half in darkness, corresponding to the dashed line position indicated for the division line 306. A conductor 324 connects the tap 316 to an amplifier 308, and the amplifier 308 runs the conveyor drive 354 at a steady speed by means of the conveyor motor 350.

In FIGURE 13, the voltage output of the photocell 376 is represented by the diagonal solid line 326. The output voltage 9 volts produces a zero voltage at the tap 316 of FIGURE 12. More illumination drives the operation upwardly and outwardly along the curve 326, calling for greater speed of the conveyor so as to relieve overetching. Less illumination, meaning underetching, drives the operation diagonally downwardly and to the left and causes proportionally reduced conveyor speed.

In FIGURE 14, the device 378 is shown to consist of a sheet of transparent plastic which is covered on all surfaces by a reflective silver paint 384, except in the surface area 382 already described and in an end area 386 which emits the light onto the photosensor 376. The triangular shape of the device 378 is best seen in FIGURE 12. Light from the long longitudinal area falls at an angle of incidence upon a portion 388 of reflective paint, and reflects at an angle of reflection therefrom so as to be condensed and to collect for emission from the small clear area 386. In that way, one photosensor 376 is able to sense the average light of an uninterrupted strip of area extending longitudinally along articles being etched.

A filter, not shown, is in practice connected in the output of each of the photosensors and allows each photosensor to pass along an AC voltage output signal at the light frequency of the illuminating lamp. Preferably, the power source for the lamps supplies alternating current thereto at a non-standard frequency and each filter is adjusted to pass frequencies only in the immediate range of that frequency. Thus, stray light falling on the photoresistors from ambient standard illuminating frequency lamps will create only a minimum of interference with the operation of the system.

One make of photosensitive device found entirely satisfactory is a Clairex photoresistor, such as the Clairex 2P and other Clairex types. Devices of this type offer high resistance in a circuit when dark, whereas with increasing illumination the photoresistor permits increasing current flow up to maximum current at saturation.

As herein disclosed, the respective sensing heads 60, 260, and 360 hereof are shown to be capable of readily monitoring a printed circuit board along the actual conductor area so as to be sensitive to relative underetching or overetching. It is evident that these heads can equally well monitor a test strip of copper or other metal film, which can be deposited as a control element of the metal on an independent translucent substrate or in the margin adjacent one edge. The metal strip is etched away from the control element as it is subjected to etchant attack, as an analogous means of determining whether the film on the operating circuit portion has been underetched or overetched. The electromechanical contact or electrode type sensing head 260 hereof is primarily adapted for speed control during etching of printed circuit boards, whereas the sensing head 60 and the proportional sensing head 360 are more universal in use. In other words, the sensing heads 60 and 360 are readily employed to monitor a range of industrially etched articles such as grids, springs, and other thin metal objects and can respond to light coming through the desired pattern delineated by and between the metal retained and the metal free portion of those objects.

Variations within the spirit and scope of the invention described are equally comprehended by the foregoing description.

What is claimed is:

1. In metal etching wherein the etchant eats completely through thin metal in all unwanted areas over a substantial portion of articles passing in a continuous series through an eaching zone, the improved process comprising:
   setting the articles in movement over a path in a spray etcher leading longitudinally through the etching zone;
   sensing, on a fixed, extended longitudinal surface confronting an extended longitudinal area along the passing articles, for an average condition of the articles in respect to underetching and overetching; and
   adjusting the rate of movement of the articles in a speed decreasing direction when the sensed average of the area is underetched.

2. In metal etching wherein the etchant eats completely through thin metal in all unwanted areas over a substantial portion of articles passing in a continuous series through an etching zone, the improved process comprising:
   imparting a rate of movement to the articles over a path in the etching zone leading longitudinally therethrough;
   sensing, on a fixed, extended longitudinal surface confronting an extended longitudinal area along the passing articles, the status of the articles in respect to underetching and overetching; and
   proportionally adjusting the rate of movement of the articles in a speed decreasing direction when the area sensed is underetched and in a speed increasing direction when the area sensed is predominantly overetched.

3. In metal etching wherein the etchant eats completely through thin metal in all unwanted areas over a substantial portion of articles passing in a continuous series through an etching zone, the improved process comprising:
   setting the articles in movement, at one speed among a given series of stepped, fixed speeds, over a path in a spray etcher leading from beginning to end of the etching zone;
   sensing, at closely spaced apart points which are along said path and which vary in their remoteness from the end of the zone, the status of the articles at those points in respect to being underetched or overetched; and
   alternately dropping speed to the next lower step when the articles sensed at a relatively less remote point have not made transition to the etched through condition, or raising speed to the immediately higher step when the articles sensed at a remote point have already reached the etched through condition.

4. In metal etching wherein the articles being etched pass in a continuous series through an etching zone, and wherein the etchant eats completely through thin metal in all unwanted areas over a substantial portion of each article, the improved process comprising:
   setting the articles in movement, at one speed among a given series of stepped, fixed speeds, over a path in an etcher leading from beginning to end of the etching zone;
   sensing, at points along said path, the status of the articles in respect of underetching or overetching relative to an etched through condition, said points comprising first, second, third, and fourth points closely spaced apart in that sequence; and
   dropping speed one step and one more step, respectively, when the articles sensed at the respective third and fourth points have not made transition to the etched through condition, or raising speed one step and one more step, respectively, when the articles sensed at the respective second and first point have already reached the etched through condition.

5. In the etching of articles wherein the articles pass in a continuous series through an etching zone, and wherein the etchant eats completely through thin metal in all unwanted metal areas on a substantial portion of each article, the improved process comprising:

setting the articles in movement, at one speed among a given series of stepped, fixed speeds, over a path in a spray etcher leading from beginning to end of the etching zone;

sensing at points along said path the status of the articles in respect to underetching or overetching relative to an etched through condition; and alternately dropping speed to the next lower step when the articles sensed at a posterior point have not made transition to an etched through condition, or raising speed to the next higher step when the articles sensed at the anterior point have already reached the etched through condition, or discontinuing etching either when the articles sensed at a more posterior point have not made transition to the etched through condition or when the articles sensed at a more anterior point have already reached the etched through condition.

6. Speed control means for the conveyor drive of a conveyorized etcher employed in the etching of the metal surfaces of articles, comprising:

means for introducing, as a control element, a substrate mounted, elongate test strip of the metal in a path through a spray chamber;

means in the chamber, directed transverse to said path, for spraying etchant on the control element to cause breakthrough of the test strip;

sensing means disposed along the path for detecting breakthrough; and means coupled to the sensing means for applying the output thereof to the conveyor drive to decrease the speed in response to untimely breakthrough, and to increase the speed of the conveyor drive with the sensing of premature breakthrough.

7. A continuous spray etcher effective for the removal of material by etching, said etcher having:

inlet and outlet stations;

spray chamber means operatively located therebetween;

conveying means for articles to be etched in the etcher, effective to cause said articles to move between said stations;

said conveying means including a drive motor connected thereto; and sensing means for automatically sensing the degree of removal of material by the etchant applied thereto in an etching zone;

said sensing means being connected to said conveying means to automatically regulate its speed in response to the degree of material removal by regulating the speed of the drive motor of said conveying means.

8. The invention of claim 7, characterized by:

said sensing means having operable means in the connection to the conveying means automatically operable in a manner, when the sensed degree of material removal is indicative of decreasing effectiveness of the etchant attack, to cause the drive motor to decrease running speed of the conveying means, and vice versa.

9. The invention of claim 8, said sensing means characterized by presenting a portion thereof to the articles at a point along the path of movement of the latter, to monitor at that point the etched through status of the material being removed from the articles.

10. The invention of claim 9, characterized by said portion of the sensing means being located at a station within the spray chamber means, such that the monitoring point is intermediate the ends of the latter to insure etch through of each article in advance of leaving the spray chamber means.

11. The invention of claim 10, said portion of the sensing means in its location at said station characterized by being transversely aligned with the passing articles such that a portion of the body of each article registers with the monitoring point.

12. The invention of claim 11, the sensing means characterized by photosensor means establishing cooperation with said portion presented by the sensing means for optically monitoring the etched through status of the material.

13. The invention of claim 7, the sensing means characterized by a location operatively related to said etching zone to sense the presence or absence of material in a substrate-mounted area thereof to which the etchant is applied, for causing the drive motor to regulate running of the conveying means in a speed decreasing direction when the sensed degree of material removal is indicative of decreasing effectiveness of the etchant attack.

14. The invention of claim 13, the etcher characterized by means defining a spaced apart path of movement for the sensed substrate-mounted material which is separate from the regular article areas being etched.

15. The invention of claim 14, the substrate-mounted material comprising an elongate control element which conforms to said path and on which the presence or obsence of the material is directly sensed.

16. The invention of claim 15, characterized by the sensing means being a means selected from the group comprising optically sensing means and electrically sensing means, for sensing presence or absence of the material on the elongate control element.

17. The invention of claim 16, the sensing means characterized by said electrically sensing means and comprising spaced apart, charged electrodes in said path, said electrodes having a position to contact the control element with which, if material is continuous thereon between the electrodes, the electrodes are conductively connected through comparatively low resistance.

18. The invention of claim 8, characterized by the operable means being a means selected from the group comprising discrete-stepped-speed operating means and proportional-speed operating means for controlling the increments of the decreases by which the drive motor decreases running speed of the conveying means, and similarly the increases.

19. In an operation of continuously conveying objects into one end of and through an etcher and out the other end so as to etch metal from the objects while constantly in transit:

introduction, in a path of exposure to etchant, of a substrate-mounted strip of essentially identical metal to the metal being etched;

dissolution in said path, by generally perpendicularly directed etchant spraying, of a portion of said strip located in the path to the breakthrough point of the metal in that portion;

detection, by sensing and delivery of a breakthrough actuated control output, of the metal breakthrough condition of said strip; and application of the breakthrough actuated output to said conveying operation to cause reduction in conveying speed in response to untimely breakthrough of the metal and to cause increased conveying speed in response to premature breakthrough.

(References on following page)

References Cited

UNITED STATES PATENTS

| | | | |
|---|---|---|---|
| 1,951,426 | 3/1934 | Littler | 134—57 |
| 2,885,637 | 5/1959 | Triman | 324—25 |
| 3,032,753 | 5/1962 | Knapp et al. | 152—345 |
| 3,300,362 | 1/1967 | Crossfield | 156—345 |

FOREIGN PATENTS 673,706  11/1963  Canada.

JACOB H. STEINBERG, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,068            September 10, 1968

Robert C. Benton

It is certified that error appears in the above identified patent and that said Letters Patent are hereby corrected as shown below:

Column 10, line 13, "eaching" should read -- etching --.
Column 12, line 15, "claim 11" should read -- claim 10 --;
lines 34 and 35, "obsence" should read -- absence --.

Signed and sealed this 9th day of December 1969.

(SEAL)
Attest:

Edward M. Fletcher, Jr.        WILLIAM E. SCHUYLER, JR.
Attesting Officer             Commissioner of Patents